United States Patent
Graner et al.

(10) Patent No.: US 9,194,347 B2
(45) Date of Patent: Nov. 24, 2015

(54) POLE BODY FOR SOLENOID VALVES PRODUCED BY MULTI-COMPONENT MIM

(75) Inventors: Juergen Graner, Sersheim (DE); Martin Maier, Moeglingen (DE); Juergen Lander, Stuttgart (DE); Jochen Rager, Bisingen (DE)

(73) Assignee: ROBERY BOSCH GMBH, Stuttgart (DE)

( * ) Notice: Subject to any disclaimer, the term of this patent is extended or adjusted under 35 U.S.C. 154(b) by 534 days.

(21) Appl. No.: 13/517,447

(22) PCT Filed: Dec. 1, 2010

(86) PCT No.: PCT/EP2010/068622
§ 371 (c)(1),
(2), (4) Date: Sep. 11, 2012

(87) PCT Pub. No.: WO2011/076535
PCT Pub. Date: Jun. 30, 2011

(65) Prior Publication Data
US 2012/0325939 A1    Dec. 27, 2012

(30) Foreign Application Priority Data

Dec. 22, 2009   (DE) .......................... 10 2009 055 133

(51) Int. Cl.
*F02M 51/06* (2006.01)
*B29C 45/14* (2006.01)
*F02M 61/16* (2006.01)

(52) U.S. Cl.
CPC ............ *F02M 51/0682* (2013.01); *B29C 45/14* (2013.01); *F02M 61/166* (2013.01); *F02M 61/168* (2013.01); *Y10T 29/49412* (2015.01)

(58) Field of Classification Search
CPC .......... F02M 51/0682; F02M 51/0671; F02M 61/166; F02M 61/168; B29C 45/14; Y10T 29/49412

USPC ......... 29/890.143, 890.12, 890.124, 890.126, 29/890.127; 239/533.2, 583, 584, 585.4, 239/585.5
See application file for complete search history.

(56) References Cited

U.S. PATENT DOCUMENTS

| 5,566,920 A | 10/1996 | Romann et al. |
| 5,632,467 A | 5/1997 | Just et al. |

(Continued)

FOREIGN PATENT DOCUMENTS

| CN | 101072942 | 11/2007 |
| CN | 201328200 | 10/2009 |
| DE | 4230376 | 4/1993 |
| DE | 4415850 | 11/1995 |

(Continued)

OTHER PUBLICATIONS

International Search Report, PCT International Application No. PCT/EP2010/068622, dated Apr. 1, 2011.

*Primary Examiner* — Ryan J Walters
(74) *Attorney, Agent, or Firm* — Kenyon & Kenyon LLP

(57) ABSTRACT

An injector having a valve opening, a cylindrical pipe, a valve opening, a valve needle situated inside the pipe in the radial direction and guided to allow axial displacement; a solenoid coil situated outside the pipe in the radial direction; a solenoid core disposed inside the pipe in the radial direction; and a magnetic armature situated inside the pipe, opposite the solenoid core in the radial direction, the magnetic armature being disposed on the valve needle. The pipe is a magnetic first material in a first pipe region and a third pipe region, the first region facing the valve opening in the axial direction, and the third pipe region facing away from the valve opening in the axial direction. The pipe is a non-magnetic second material in a second pipe region, the second pipe region being between the first pipe region and the third pipe region in the axial direction.

2 Claims, 3 Drawing Sheets

(56) References Cited

U.S. PATENT DOCUMENTS

| | | |
|---|---|---|
| 5,687,468 A | 11/1997 | Hans et al. |
| 7,963,465 B2 | 6/2011 | Lander et al. |
| 2009/0127354 A1 | 5/2009 | Matsusaka et al. |
| 2009/0200405 A1 | 8/2009 | Yoshimaru et al. |
| 2010/0281691 A1 | 11/2010 | Seitter et al. |

FOREIGN PATENT DOCUMENTS

| | | |
|---|---|---|
| DE | 102004058803 | 6/2006 |
| DE | 102005036950 | 2/2007 |
| DE | 102005039288 | 2/2007 |
| DE | 102005052252 | 5/2007 |
| JP | 9-505380 | 5/1997 |
| JP | 2002-31009 | 1/2002 |
| JP | 2007-205229 | 8/2007 |

POLE BODY FOR SOLENOID VALVES PRODUCED BY MULTI-COMPONENT MIM

FIELD OF THE INVENTION

The present invention is based on a fuel injector, especially for fuel injection systems of internal combustion engines in motor vehicles. The present invention also relates to a method for producing a fuel injector.

BACKGROUND INFORMATION

German Patent Application No. DE 10 2004 058 803 A1 describes a fuel injector which has a valve seat support, which includes a valve seat that is situated at the end of the valve seat support and encloses a valve opening; a valve needle which is disposed coaxially in the valve seat support and guided in axially displaceable manner, the valve needle, at its end facing the valve seat, having a valve closure element which cooperates with the valve seat in order to close and release the valve opening; an electromagnet for lift actuation of the valve needle, which is provided with an inner, hollow-cylindrical solenoid core, an outer magnetic cup, an interposed solenoid coil connected to a connection plug, and a magnetic armature situated axially opposite the solenoid core, which magnetic armature is disposed at the needle end of the valve needle pointing away from the valve closure element. The valve opening and valve seat are formed on the one-piece valve seat support itself, and the axially displaceable guidance of the valve needle is assigned to the valve seat support, the solenoid coil and connection plug being combined into a plastic extrusion-coated, separate coil part.

German Patent Nos. DE 42 30 376 C1 and DE 44 15 850 A1 describe that an armature section and a valve sleeve section of a valve needle may be produced as one piece through injection molding and subsequent sintering according to the metal injection molding (MIM) method. A non-magnetic intermediate piece fixes the valve seat support in place on the hollow-cylindrical solenoid core, using welding, for instance.

In addition, German Patent Application No. DE 10 2005 036 950 A1 describes that two method processes are used to produce a molded part as a metallic component made up of two parts, each process employing an MIM method. German Patent Application No. DE 10 2005 052 252 A1 describes that one of the components forming the valve housing is shaped by means of metal injection molding.

U.S. Patent Application Publication No. U.S. 2009/0127354 A1 describes an injector for which a tube and a housing are produced as an integral component.

SUMMARY

An example injector according to the present invention and an example method according to the present invention may offer the advantage that the flux loss resulting from a magnetic short-circuit in the solenoid circuit made up of magnetic armature, solenoid core, magnetic cup and solenoid coil is kept relatively low, so that the highest possible magnetic force for lifting the valve needle or the highest possible retention force is achievable. In this way a relatively high dynamic response of the valves is able to be obtained.

According to one further development of the present invention, the pipe may be produced with the aid of a metal injection molding (MIM) method, preferably by means of a two-component MIM method. The use of the MIM method makes it possible to reduce the manufacturing costs to a relatively high degree. Complex and complicated geometries are able to be produced by MIM methods, and different materials may be used to produce an integral component.

According to another further refinement of the present invention, the pipe and the solenoid core are produced as an integral component. This integral construction method using MIM technology simplifies the production considerably. The production processes are therefore able to be reduced and considerable cost savings are achievable.

According to another further refinement of the present invention, the solenoid core has a third material on a surface facing the solenoid armature in the axial direction, the third material essentially having relatively high hardness. A hard surface leads to relatively high wear resistance, which is necessary because the armature strikes the solenoid core.

According to one further refinement of the present invention, the solenoid core has profiling, preferably beveling, on the surface facing the solenoid armature in the axial direction. This profiling or beveling advantageously makes it possible to prevent hydraulic adhesion between the solenoid armature and solenoid core, which increases the dynamic response of the injector considerably.

According to another further refinement of the present invention, the pipe has a radial flange in the first pipe section, and the pipe and radial flange are produced as an integral component by a MIM method. This integral construction method using MIM technology simplifies the production considerably. Thus, the production processes are reducible, and considerable cost savings are able to be realized.

According to another further refinement of the present invention, the pipe has additional profiling in the area of the coil windings of the solenoid coil. This further profiling allows coil windings of the solenoid coil to be situated on the pipe. This system uses relatively little space.

In accordance with the present invention, an example method is provided for producing an injector. This method advantageously makes it possible to keep the flux loss resulting from a magnetic short-circuit in the solenoid circuit, made up of solenoid armature, solenoid core, magnetic cup and solenoid coil, relatively low, so that the highest possible magnetic force for lift actuation of the valve needle or the highest possible retention force is achievable. This ensures a relatively high dynamic response of the valves.

According to one further refinement of the present invention, the pipe, a radial flange and a solenoid core are produced as an integral component by means of MIM technology. Use of the MIM method makes it possible to reduce the production costs quite considerably. Complex and complicated geometries are able to be produced with the aid of MIM methods, and different materials may be used to produce an integral component.

Exemplary embodiments of the present invention are illustrated in the figures and explained in greater detail below.

DETAILED DESCRIPTION OF EXAMPLE EMBODIMENTS

In the various figures, identical parts are denoted by the same reference symbols and as a result, are usually labeled or mentioned only once.

Figure 1:
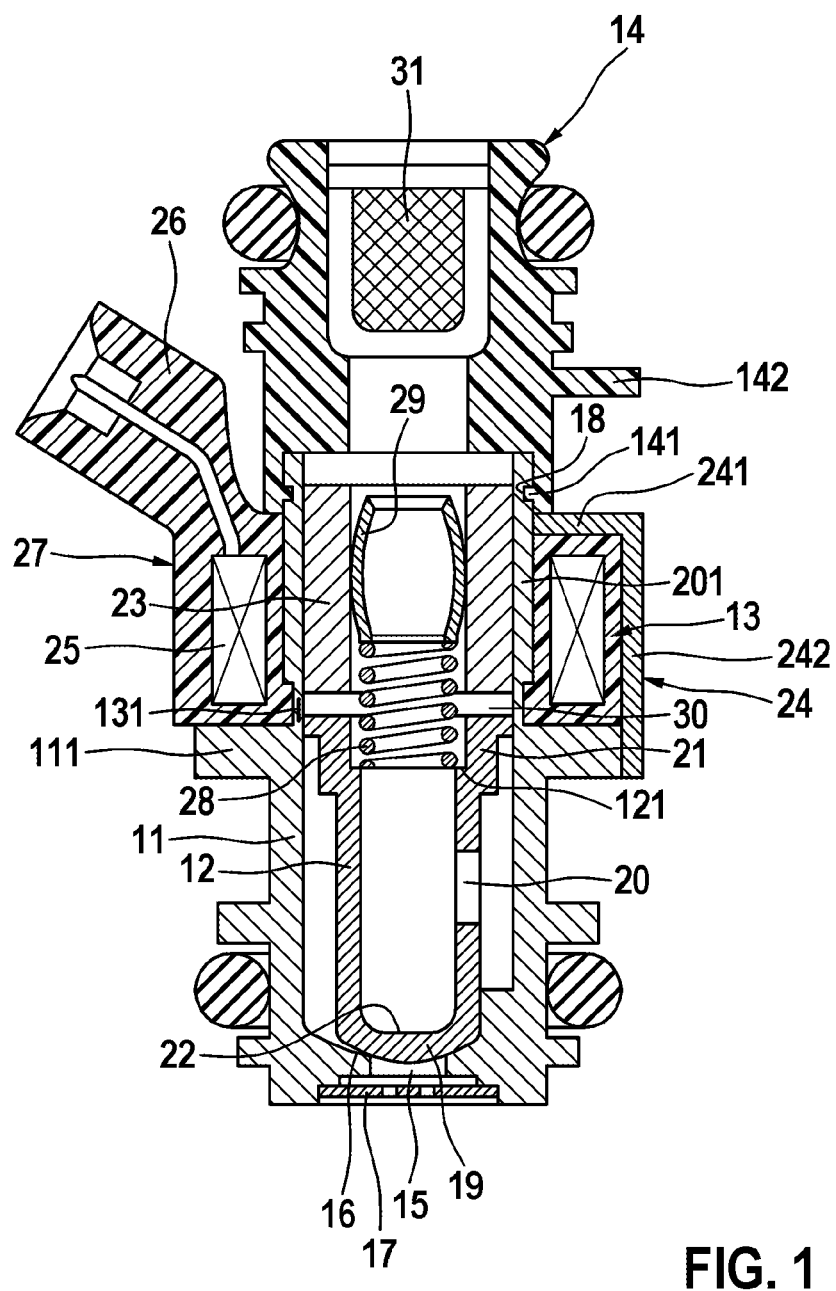
FIG. 1 shows a schematic illustration of a conventional injector.

The conventional injector schematically shown in longitudinal section in FIG. 1 is used in fuel-injection systems of internal combustion engines in motor vehicles. It has a valve seat support 11, a valve needle 12 disposed coaxially inside valve seat support 11, an electromagnet 13 for actuating valve needle 12, and a connection piece 14 for conveying fuel.

In the production of valve seat support 11, a valve opening 15 and a valve seat 16 surrounding it are formed or premolded in the base region of valve seat support 11. On the outer side facing away from valve seat 16, a recess, in which a spray orifice disk 17 is fixed in place, is formed in the floor of valve seat support 11, coaxially with valve opening 15. At its end facing away from valve seat 16, valve seat support 11 is provided with a circumferential annular groove 18 on the outside.

For the entry of fuel, hollow-cylindrical valve needle 12 is open at its end facing away from valve seat 16; at its other end facing valve seat 16, it has a valve closure member 19, which cooperates with valve seat 16 to release and close valve opening 15. For the discharge of fuel, valve needle 12 is provided with an exit hole 20, which extends radially through the cylinder wall. Situated at the end of valve needle 12, facing away from valve closure member 19, is a magnetic armature 21 via which valve 12 is guided in valve seat support 11 so as to be axially displaceable. A planar surface 22 aligned inside on valve closure element 19 is used as reference surface for adjusting the valve lift.

In addition to magnetic armature 21 integrally formed with valve needle 12, electromagnet 13 includes a hollow-cylindrical solenoid core 23 lying on the inside, a magnetic cup 24 which lies on the outside and preferably is deep-drawn, and a solenoid coil 25 which is disposed between solenoid core 23 and magnetic cup 24 and made up of excitation windings wound onto a coil brace. Solenoid coil 25 is connected to a connector plug 26. Hollow-cylindrical solenoid core 23 is pressed into valve seat support 11 on the end of valve seat support 11 facing away from valve seat 16. Its press-in depth defines the lift of valve needle 12.

Solenoid coil 25 and connector plug 26 are combined into a plastic-extrusion-coated coil part 27, which is slipped onto valve seat support 11. Magnetic cup 24 is placed on top of plastic-extrusion-coated coil part 27; cup base 241 of magnetic cup 24 surrounds valve seat support 11, and its cup casing 242 at the cup opening edge overlaps a radial flange 111 premolded on valve seat support 11 at the cup-opening edge, virtually without play. Radial flange 111 is situated on valve needle 12 at the level of magnetic armature 21.

Via its valve closure member 19, valve needle 12 is pressed onto valve seat 16 by a valve-closure spring 28 configured as compression spring. To this end, valve-closure spring 28 is braced inside a radial annular shoulder 121 formed in the interior of valve 12 on the one side, and on an adjusting sleeve 29, which is pressed into solenoid core 23, on the other. The press-in depth of adjusting sleeve 29 defines the spring pre-stressing of valve closure spring 28 and thus the closing force of valve needle 12. When the valve is closed, a working air gap 30 is present between the annular end faces of magnetic armature 21 and solenoid core 23. Solenoid core 23, magnetic cup 24, solenoid coil 25, and magnetic armature 21 form a magnetic circuit.

Connection piece 14 is produced as separate injection-molded plastic component having an integrated filter 31. On the one side, it has an annular web 141, which creates a clip-on connection with annular groove 18 on valve seat support 11, and it has a radially projecting mounting nib 142, which serves as locking element and is used for the correct positional insertion of the injector in a fuel collector line.

In this conventional injector, the magnetic short circuit is reduced in that valve seat support 11 is provided with a narrowing 131 (throttling point). In the injector according to the present invention, the magnetic short circuit is avoided and a magnetic separation is created by a simple manufacturing method.

Figure 2:
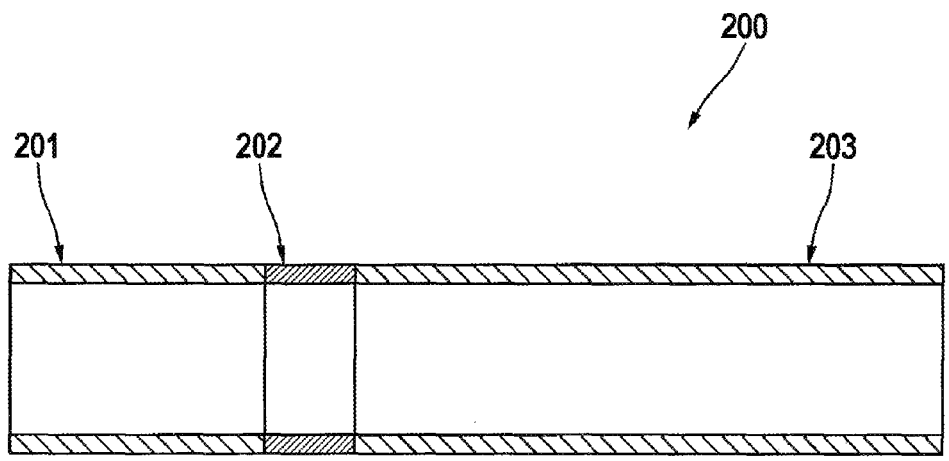
FIG. 2 shows a schematic illustration of a pipe according to a first specific embodiment of the present invention.

FIG. 2 shows a schematic representation of a pipe 200 according to a first specific embodiment of the present invention. Pipe 200 is developed as cylindrical body and has three consecutive pipe regions 201, 202, 203 in the axial direction. First pipe region 201 is situated at the particular end of pipe 200 that is facing valve opening 15; third pipe region 203 is situated at the particular end of pipe 200 that is facing away from valve opening 15. Second pipe region 202 is disposed between first and third pipe regions 201, 203. The three pipe regions have different material properties. First pipe region 201 and third pipe region 203 of pipe 200 are produced from a magnetic first material, the first material having essentially magnetically conductive or ferritic properties. Second pipe region 202 of pipe 200 is made of a non-magnetic second material (magnetic separation), the second material being generally not magnetically conductive, or austenitic.

The production of the pole tube utilizes, for instance, a 2-component metal injection molding method (MIM). The production by MIM method offers the advantage that complex or complicated geometries are able to be produced as well. Bore holes having a minimal bore diameter of approximately 0.1 mm, for example, are able to be produced by means of MIM technology. Furthermore, MIM technology may be used to produce wall thicknesses of less than approximately 1 mm, for instance. The manufacturing tolerances are relatively low. When producing the powder injection molding compounds, binder systems are used for homogenizing the metal powders for the injection molding machines. A goal of the processing is to coat all metal powder particles by the binder system, in order to prevent or destruct agglomerates of the metal powder grains and to produce the most homogeneous granulate possible (also known as feedstock). All sinterable powders of suitable grain size may be used as base materials for the injection molding of metal powder, such as metals, e.g., low-alloyed steels, noble metals, hard metals such as wolfram carbide having 12 weight % Co. Another possibility is also a 2-K-CIM (ceramic injection molding) method using ceramics such as zirconium oxide. The grains of the used metal powder preferably have an average grain size of approximately 4 μm to approximately 20 μm.

For shaping, the feedstock is injection-molded into cooled dies, sicj as liquid-cooled (especially dies cooled by water or oil). Feeding screws and cylinders are preferably made of relatively hard material, in particular of steel material or bimetal material. Following the injection-molding process, the components (also known as green compacts) are released from the die.

Wax materials may be used as binder system. The wax material is melted out of the green compact by relatively low heating. This process is referred to as debinding, and the porous molded part then obtained is known as brown compact. In addition, thermoplast materials, poly-alcohols, polyoxymethylenes (POM) or polyvinyl alcohols are usable as binder systems.

The final sintering converts the brown compact into the end product. The brown compact is heated in a sintering furnace. The temperature preferably is approximately 1200° C. to approximately 1300° C. Sintering preferably takes place in an inert gas atmosphere of nitrogen or hydrogen, furthermore preferably in a vacuum.

The use of the MIM method makes it possible to reduce the manufacturing costs quite considerably. Complex and complicated geometries are able to be produced with the aid of MIM methods, and different materials may be used to produce an integral component.

Figure 3:
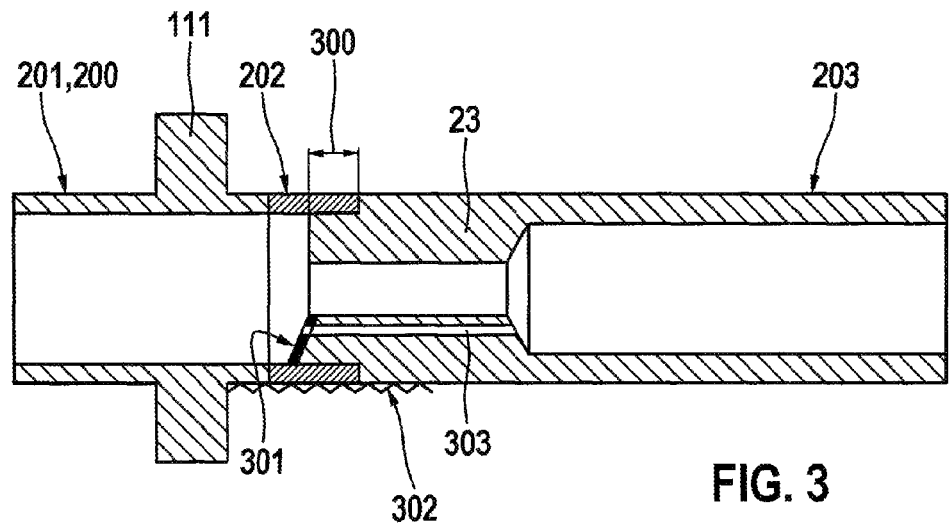
FIG. 3 shows a schematic illustration of a pipe according to a second specific embodiment of the present invention.

FIG. 3 shows a schematic illustration of pipe 200 according to a second specific embodiment of the present invention. Pipe 200, radial flange 111, and solenoid core 23 are produced as an integral component utilizing MIM technology. Pipe 200 has first, second and third pipe regions 201, 202, 203. Furthermore, pipe 200 has an overlap region 300 in which the non-magnetic second material (magnetic separation) is situated on the magnetic first material of solenoid core 23 in the radial direction Solenoid core 23 has a bevel 301, such as on a surface facing magnetic armature 21. This bevel 301 makes it possible to prevent hydraulic adhesion between solenoid armature 21 and solenoid core 23. Furthermore, the stop pulse (noise) is able to be positively influenced by a suitable design of the surface. As an alternative, the hydraulic adhesion may be prevented by scoring the surface, by a stepped surface or by a profiled surface of solenoid core 23. Furthermore, at least one bore hole 303 may be disposed through solenoid core 23 in the axial direction so as to reduce hydraulic adhesion. In addition, bevel 301 is able to be hardened by a nitriding method, for instance. This hardening leads to increased wear resistance of the surface of solenoid core 23. As an alternative, the use of MIM technology makes it possible to produce bevel 301 from a hard material such as a hard metal or a ceramic material. The use of MIM technology furthermore allows additional profiling 302 to be created on the outer surface of pipe 200. This additional profiling 302 allows the placement of coil windings of solenoid coil 25, and thus results in a compact and space-saving production.

Figure 4:
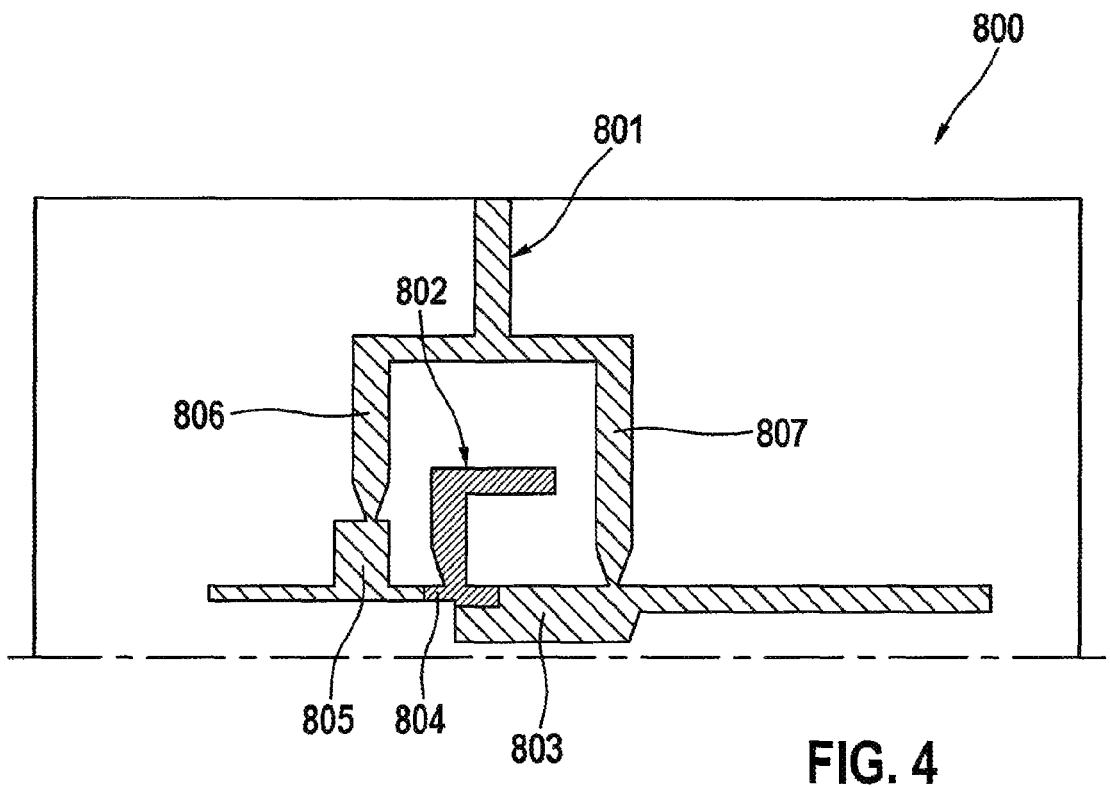
FIG. 4 shows a schematic illustration of an injection molding die for the production of a pipe according to the present invention.

FIG. 4 shows a schematic representation of an injection molding die for producing pipe 200 according to the present invention. First, a contour of pipe 200 having three contour regions 803, 804, 805 is introduced in a die material 800. In addition, the die has spray channels 801, 802. To produce pipe 200, in a first step, a feed screw is used to introduce a non-magnetic powder metal molded compound, which generally is made up of a non-magnetic, especially austenitic material (magnetic separation), into spray channel 802. The austenitic powder metal molding compound arrives in contour region 804 and forms the magnetic separation between the front region of pipe 200 and solenoid core 23. To produce pipe 200, in a second step, a feed screw is used to introduce a ferritic powder metal molding compound, which generally consists of a magnetic, in particular ferritic material, into spray channel 801. The ferritic powder metal molding compound reaches contour regions 805 and 803 via channel arms 806 and 807. The ferritic powder metal molding compound forms solenoid core 23 and the rear part of pipe 200 in contour region 803. The ferritic powder metal molding compound forms the front region of pipe 200 and radial flange 111 in contour region 805. After injecting the powder metal molding compounds, the injected-molded component is subjected to debinding and sintering.

Figure 5:
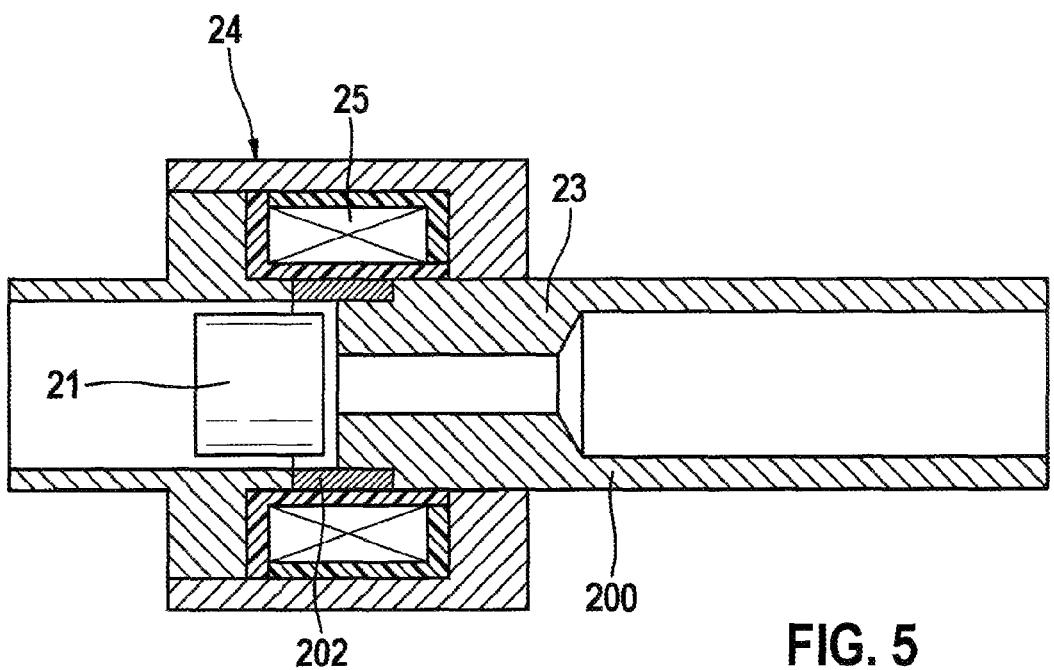
FIG. 5 shows a schematic illustration of a magnetic circuit of an injector according to a third specific embodiment of the present invention.

FIG. 5 shows a schematic illustration of the completion of the second specific development from FIG. 3 for forming a complete magnetic circuit. Magnetic cup 24 is pressed onto pipe 200 on the outside and surrounds solenoid coil 25 at least partially. Pipe 200, which preferably is produced by means of 2-component MIM technology, includes radial flange 111 and solenoid core 23. The magnetic separation in second pipe region 202 is realized by the non-magnetic second material. The magnetic circuit includes magnetic armature 21, solenoid coil 25, magnetic cup 24, and solenoid core 23. The non-magnetic second material in second pipe region 202 prevents the magnetic short circuit.

What is claimed is:

1. An injector, comprising:
    a pipe;
    a valve opening;
    a valve needle situated inside the pipe in a radial direction and guided so as to allow displacement; and
    a solenoid coil situated outside the pipe in the radial direction;
    wherein:
        the injector includes:
            a stationary solenoid core, which is, with respect to the radial direction, fixed to an interior of the pipe; and
            a magnetic armature inside the pipe, at an end of the valve needle that faces away from the valve opening;
        the pipe is made of a magnetic first material in a first pipe region and in a third pipe region;
        the first pipe region faces the valve opening in the axial direction;
        the third pipe region faces away from the valve opening in the axial direction;
        the pipe, in a second pipe region, is made of a non-magnetic second material;
        the second pipe region is disposed between the first pipe region and the third pipe region in the axial direction, and
        the pipe is produced by a metal injection molding method using a two-component MIM method;
        wherein the stationary solenoid core has a third material on a surface facing the magnetic armature in the axial direction, the third material having relatively high hardness;
    wherein the first, second and third pipe regions are flush on the exterior of the pipe.

2. The injector as recited in claim 1, wherein the solenoid core has profiling on a surface facing the magnetic armature in the axial direction.

* * * * *